(12) United States Patent
Adkisson

(10) Patent No.: US 7,245,684 B2
(45) Date of Patent: Jul. 17, 2007

(54) SYSTEM AND METHOD FOR COMPENSATING FOR SKEW BETWEEN A FIRST CLOCK SIGNAL AND A SECOND CLOCK SIGNAL

(75) Inventor: Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 10/630,317

(22) Filed: Jul. 30, 2003

(65) Prior Publication Data

US 2004/0223570 A1 Nov. 11, 2004

Related U.S. Application Data

(60) Provisional application No. 60/469,120, filed on May 9, 2003.

(51) Int. Cl.
    *H04L 7/02* (2006.01)
(52) U.S. Cl. .............. 375/359; 375/219; 375/226; 375/224; 375/354; 375/371; 713/503
(58) Field of Classification Search ............. 375/371, 375/219, 226, 224, 354; 713/503
See application file for complete search history.

(56) References Cited

U.S. PATENT DOCUMENTS

| | | | |
|---|---|---|---|
| 5,347,559 A | 9/1994 | Hawkins et al. | |
| 5,721,886 A | 2/1998 | Miller | |
| 5,811,998 A * | 9/1998 | Lundberg et al. | 327/156 |
| 6,075,832 A | 6/2000 | Geannopoulos et al. | |
| 6,081,572 A | 6/2000 | Filip | |
| 6,084,934 A | 7/2000 | Garcia et al. | |
| 6,114,915 A | 9/2000 | Huang et al. | |
| 6,134,155 A | 10/2000 | Wen | |
| 6,175,603 B1 | 1/2001 | Chapman et al. | |
| 6,182,236 B1 * | 1/2001 | Culley et al. | 713/503 |
| 6,246,275 B1 | 6/2001 | Wodnicki et al. | |
| 6,249,875 B1 | 6/2001 | Warren | |
| 6,326,824 B1 | 12/2001 | Hosoe et al. | |
| 6,369,624 B1 | 4/2002 | Wang et al. | |
| 6,529,083 B2 | 3/2003 | Fujita | |
| 2001/0033630 A1 * | 10/2001 | Hassoun et al. | 375/376 |
| 2002/0051509 A1 | 5/2002 | Lindner et al. | |
| 2002/0158671 A1 | 10/2002 | Wang et al. | |
| 2002/0199124 A1 | 12/2002 | Adkisson | |

\* cited by examiner

*Primary Examiner*—Mohammed Ghayour
*Assistant Examiner*—Mohsin Benghuzzi

(57) ABSTRACT

A system and method for compensating for skew in a programmable clock synchronizer for effectuating data transfer between first circuitry disposed in a first clock domain and second circuitry disposed in a second clock domain. In a system embodiment, a phase detector is provided for detecting a phase between the first and second clock signals. A skew state detector disposed in communication with the phase detector is operable to generate a skew state signal which tracks a phase relationship between the clock signals. A synchronizer control signal generator responds to the skew state signal by generating at least one control signal to compensate for the skew between the first clock signal and the second clock signal.

20 Claims, 7 Drawing Sheets

SYSTEM AND METHOD FOR COMPENSATING FOR SKEW BETWEEN A FIRST CLOCK SIGNAL AND A SECOND CLOCK SIGNAL

PRIORITY UNDER 35 U.S.C. §119(e) & 37 C.F.R. §1.78

This nonprovisional application claims priority based upon the following prior U.S. provisional patent application entitled: "Programmable Clock Synchronizer and Controller Arrangement Therefor," Application No.: 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned co-pending patent applications: (i) "Programmable Clock Synchronizer," filed Jul. 30, 2003; application Ser. No. 10/630,159, in the name(s) of: Richard W. Adkisson; (ii) "Controller Arrangement for a Programmable Clock Synchronizer," filed Jul. 30, 2003; application Ser. No. 10/630,182, in the name(s) of: Richard W. Adkisson; (iii) "System and Method for Synchronizing Multiple Synchronizer Controllers," filed Jul. 30, 2003; application Ser. No. 10/629,989, in the name(s) of: Richard W. Adkisson; (iv) "System and Method for Maintaining a Stable Synchronization State in a Programmable Clock Synchronizer," filed Jul. 30, 2003; application Ser. No. 10/630,297, in the name(s) of: Richard W. Adkisson; and (v) "Phase Detector for a Programmable Clock Synchronizer," filed Jul. 30, 2003; application Ser. No. 10/630,298, in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \leq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Typically, phase-locked loops (PLLs) are utilized in conventional synchronizer circuitry arrangements to produce clocks of different yet related frequencies. The PLLs may have a large amount of input/output (I/O) jitter that results in low frequency phase difference, or skew, between different clocks of the synchronizer circuitry. Accordingly, it is essential to provide compensation for the skew between different clocks of the synchronizer circuitry.

SUMMARY

A system and method are disclosed that provide for skew compensation in a programmable clock synchronizer for effectuating data transfer between first circuitry disposed in a first clock domain and second circuitry disposed in a second clock domain. In a system embodiment, a phase detector is provided for detecting a phase between the first and second clock signals. A skew state detector disposed in communication with the phase detector is operable to generate a skew state signal which tracks a phase relationship between the clock signals. A synchronizer control signal generator responds to the skew state signal by generating at least one control signal to compensate for the skew between the first clock signal and the second clock signal.

DETAILED DESCRIPTION OF THE DRAWINGS

Figure 1:
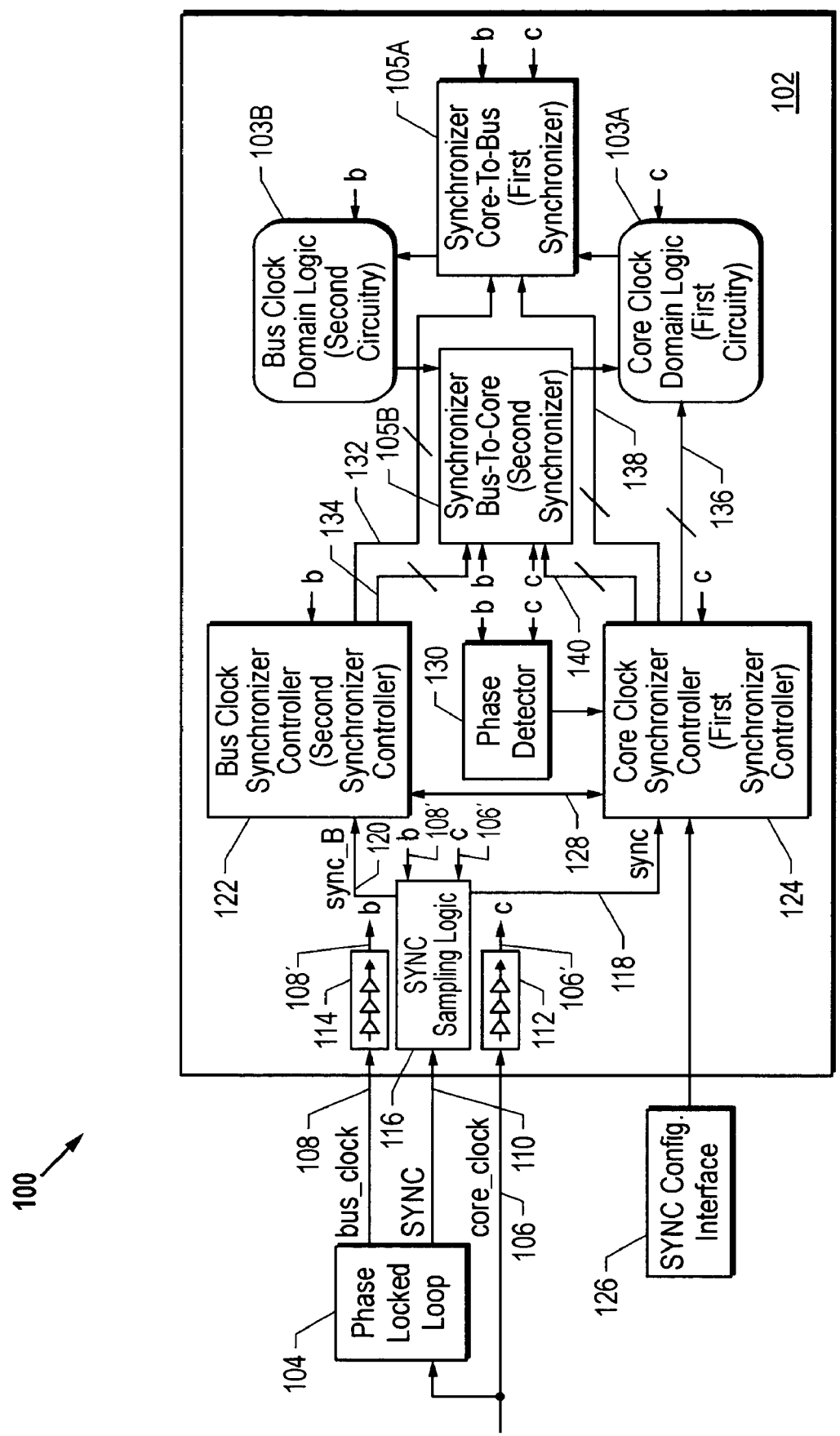
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. In one embodiment, the sampled SYNC pulses are manufactured as follows. The SYNC pulse 110 is sampled twice by two flip flop (FF) elements (not shown in FIG. 1) that are clocked on the rising edge of the distributed core_clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (not shown in this FIG.) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108', and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller clock relationship control signal(s) provided to the core clock synchronizer controller 124.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the distributed core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff B" suffix to indicate the registration process by the distributed core_clock or the distributed bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core clock signal in accordance therewith. On the other hand, where the core clock signal is stable with respect to the SYNC pulse, the inter-controller clock relationship control signals are generated by the core clock synchronizer controller 124 for transmission to the bus clock synchronizer controller 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

Additional details regarding the various sub-systems described hereinabove may be found in the following commonly owned co-pending patent applications: (i) "Programmable Clock Synchronizer," filed Jul. 30, 2003; application Ser. No. 10/630,159, in the name(s) of: Richard W. Adkisson; (ii) "Controller Arrangement for a Programmable Clock Synchronizer," filed Jul. 30, 2003; application Ser. No. 10/630,182, in the name(s) of: Richard W. Adkisson; (iii) "System and Method for Synchronizing Multiple Synchronizer Controllers," filed Jul. 30, 2003; application Ser. No. 10/629,989, in the name(s) of: Richard W. Adkisson; (iv) "System and Method for Maintaining a Stable Synchronization State in a Programmable Clock Synchronizer," filed Jul. 30, 2003; application Ser. No. 10/630,297, in the name(s) of: Richard W. Adkisson; and (v) "Phase Detector for a Programmable Clock Synchronizer," filed Jul. 30, 2003; application Ser. No. 10/630,298, in the name(s) of: Richard W. Adkisson, all of which are incorporated by reference herein.

As set forth above, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where $N/M \geq 1$. For purposes of illustration, the operation of an embodiment of the programmable synchronizer system 100 is set forth in detail below for transferring data from the bus clock domain to the core clock domain, the clock domains having a 5:4 frequency ratio.

Figure 2:
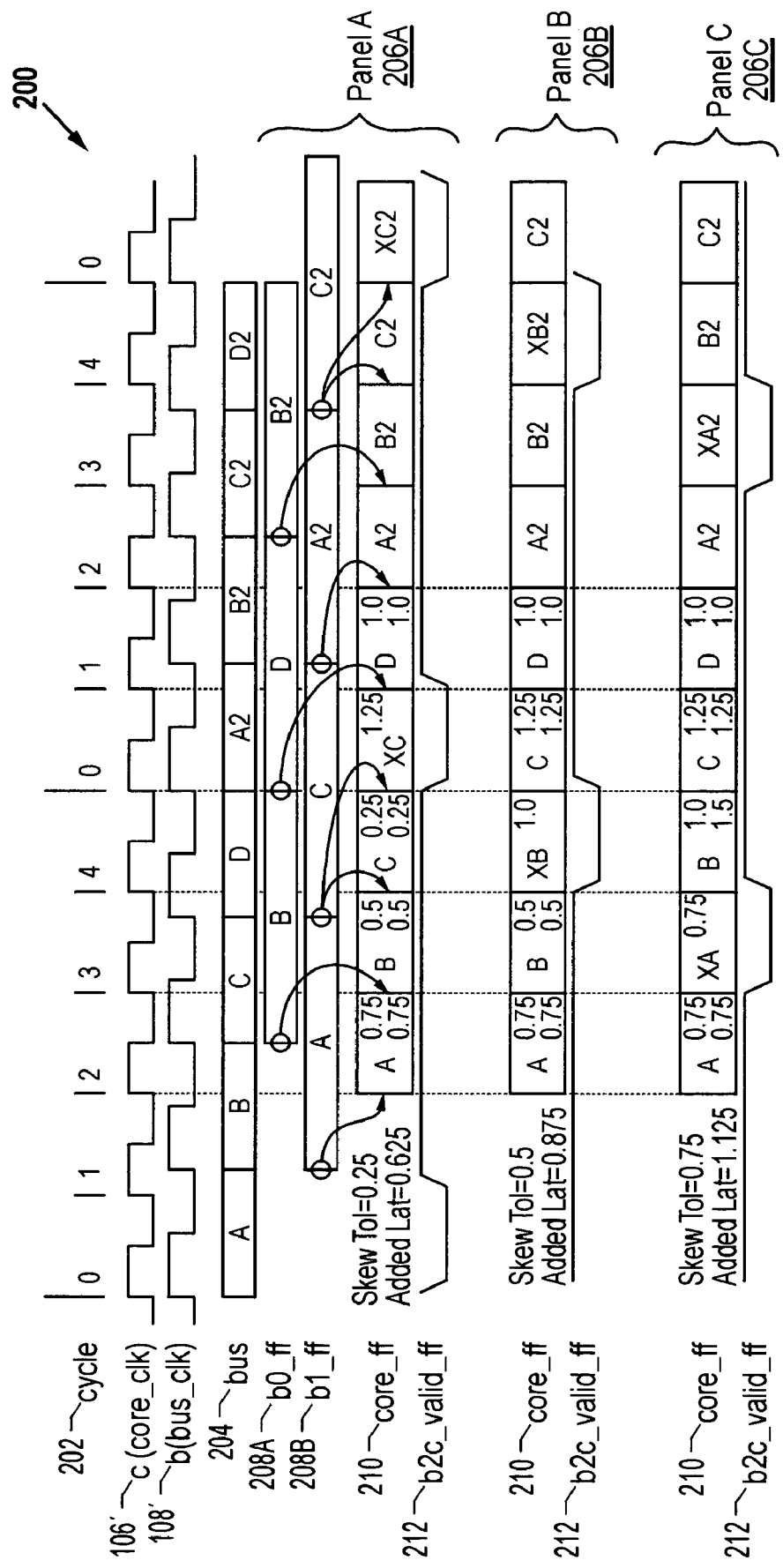
FIG. 2 depicts a timing diagram associated with data transfer from bus clock domain circuitry to core clock domain circuitry, the domains having a 5:4 frequency ratio, wherein the programmable synchronizer of FIG. 1 may be utilized.

FIG. 2 depicts a timing diagram 200 of two clock domains having a 5:4 frequency ratio wherein the programmable synchronizer system of FIG. 1 may be utilized for effectuating data transfer across the clock boundary from bus clock domain circuitry to core clock domain circuitry. In particular, FIG. 2 illustrates the temporal relationship of the various control signals associated with the synchronizer system 100 of FIG. 1 and the effect of different skew tolerances and latencies. A cycle count 202 refers to the numbering of core_clock cycles in a particular timing sequence. Two sequences of bus data 204, [A,B,C,D] and [A2,B2,C2,D2], are exemplified, each block being k-bit wide and available for a particular clock cycle, 0 through 3. Different skew tolerances and latency factors may be programmed and, in particular, in a 5:4 mode, for example, a multiplexer register block of a bus-to-core synchronizer circuit (not illustrated) that is clocked by the core clock may capture data five times but since only four data transfers can come from the bus domain, only four will be used (the extra cycle having an unused data portion, marked with an X in the Panels 206A-206C). Further details regarding the data loading and capture control functionality of an exemplary bus-to-core synchronizer circuit may be found in the aforementioned co-pending U.S. patent application entitled "Programmable Clock Synchronizer" application, filed Jul. 30, 2003; application Ser. No. 10/630,159, in the name(s) of: Richard W. Adkisson.

In Panel A 206A, data transfer from the bus domain circuitry, bus data being loaded via a pair of multiplexer-register blocks to be provided as data b0_ff 208A and b1_ff 208B, to the core domain circuitry, as captured data output core_ff 210, is shown where a condition involving a skew tolerance of 0.25 and added latency of 0.625 is programmed. Skew tolerance, which is measured in core clock cycles in this case, is defined as the minimum distance between data sample (i.e., core_ff 210) and changing data input (i.e., b0_ff 208A or b1_ff 208B). Added latency is also measured in core clock cycles, obtained by averaging the values associated with the four data blocks (from start of the data input, i.e., b0_ff or b1_ff to core_ff). Actual latency is determined as one bus_clock cycle plus the added latency, which in the 5:4 mode translates to 1.25 core_clock cycles plus the added latency.

As shown in Panel A 206A, which exemplifies the best latency condition but with the worst skew tolerance, the core clock synchronizer controller 124 generates the b2c_valid_ff 212 signal such that there is no valid RX operation on cycle 0 of the core_clock (i.e., its first cycle). The output, i.e., core_ff 210, includes data block [A] from b1_ff 208B, then data block [B] from b1_ff 208A, then data block [C] from b1_ff 208B, and then data block [C] again (in cycle 0 of the core_clock's second sequence, which is the extra cycle unused, hence giving rise to the invalid C or XC data block), and finally, data block [D] from b0_ff 208A. Since the valid [C] block was loaded into the core_ff 210 from b1_ff 208B 0.25 core_clock cycles after b1_ff 208B loaded it, the skew tolerance is 0.25 core_clock cycles.

Panel B 206B of FIG. 2 exemplifies the programming mode with the next best latency condition (added latency=0.875) which has the next best skew tolerance (=0.5 core_clock cycles). Under these conditions, the core clock synchronizer controller 124 generates b2c_valid_ff 212 such that it is driven LOW in the fifth core_clock cycle (i.e., cycle 4). The output, i.e., core_ff 210, includes data block [A] from b1_ff 208B, then data block [B] from b0_ff 208A, and again data block [B] that is not used (in cycle 4 of the core_clock's first sequence, which is the extra cycle unused, hence giving rise to the invalid B or XB data block), then data block [C] from b1_ff 208B, and finally, data block [D] from b0_ff 208A. Since the valid [B] block was loaded into core_ff 210 from b0_ff 208A 0.5 core_clock cycles after it appeared on b0_ff 208A, the skew tolerance is 0.5 core_clock cycles.

The programming mode with the worst latency (=1.125) and the best skew tolerance (=0.75 of core_clock cycles) is shown in Panel C 206C of FIG. 2. The core clock synchronizer controller 124 generates b2c_valid_ff 212 such that it is driven LOW in the fourth core_clock cycle (i.e., cycle 3). The output, i.e., core_ff 210, includes block [A] from b1_ff 208B (in cycle 2 of the core clock's first sequence), and again data block [A] that is not used (in cycle 3 of the core_clock's first sequence, which is the extra cycle unused, hence giving rise to the invalid A or XA data block), and then data block [B] from b0_ff 208A, then data block [C] from b1_ff 208B, and finally, data block [D] from b0_ff 208A. Since the valid [A] block was loaded into core_ff 210 from b1_ff 208A 0.75 core_clock cycles after it appeared on b1_ff 208A, the skew tolerance is 0.75 core_clock cycles. As pointed out earlier, the added latency is the average of the time (in core_clock cycles) from b0_ff or b1_ff to core_ff for all used data. Accordingly, no latency value is shown in any data portion with an X.

Based on the foregoing discussion, it should be appreciated that the synchronizer embodiment of the present invention may be programmed for different latencies and skew tolerances for transferring data across a clock boundary between any two clock domains having a known N:M ratio (e.g., M=N−1). It should be recognized, however, that regardless of the programmed latency and skew tolerance, the core clock may lag behind the bus clock far enough for the coincident edges to move to the next bus clock edge. Alternatively, the core clock may lead the bus clock far enough for the coincident edges to move to the previous clock edge. The teachings disclosed herein compensate for a variably large skew between the core clock signal and the bus clock signal, e.g., greater than one clock period difference between the core clock signal and the bus clock signal. Moreover, as will be discussed in more detail hereinbelow, the teachings disclosed herein can compensate for an infinite amount of skew.

Figure 3:
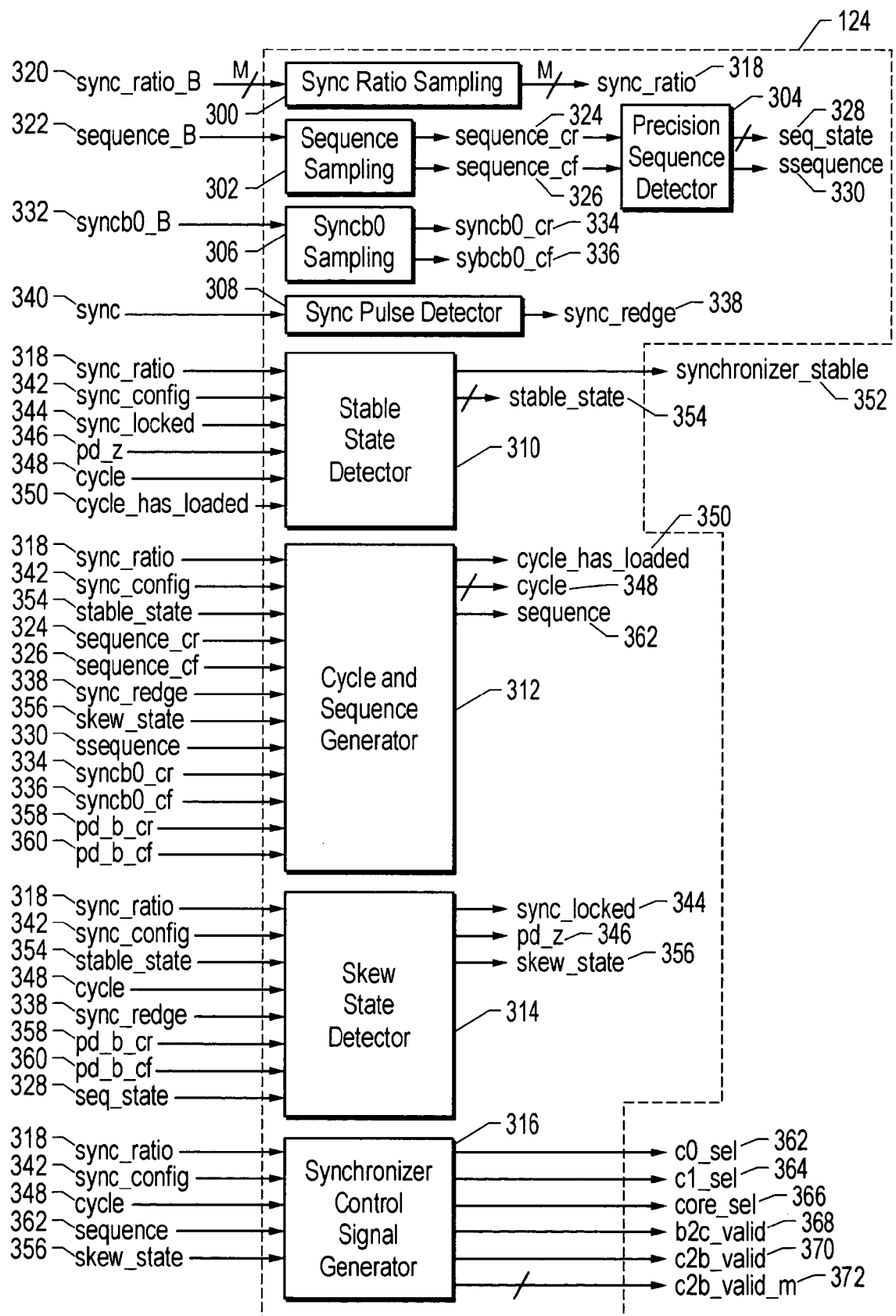
FIG. 3 depicts a block diagram of an embodiment of a core clock synchronizer controller for effectuating data transfer across a clock boundary.

FIG. 3 depicts an embodiment of a core clock synchronizer 124 controller for effectuating data transfer across a clock boundary. The core clock synchronizer comprises several interconnected logic components including a synchronizer (sync) ratio sampling block 300, a sequence sampling block 302, a precision sequence detector block 304, a syncb0 sampling block 306, a synchronizer pulse detector block 308, a stable state detector block 310, a cycle and sequence generator block 312, a skew state detector block 314, and a synchronizer control signal generator block 316. As set forth in additional detail in the co-pending U.S. patent application entitled "Controller Arrangement for a Programmable Clock Synchronizer," filed Jul. 30, 2003; application Ser. No. 10/630,182, in the name(s) of: Richard W. Adkisson, various inter-controller clock relationship control signals, namely, sync_ratio_B 320, sequence_B 322 and syncb0_B 332, are provided as inputs to the core clock synchronizer controller circuitry from the corresponding bus clock synchronizer controller. As further discussed therein, these inter-controller control signals are used in conjunction with synchronization configuration information provided via SYNC configuration interface 126 (shown in FIG. 1) to manufacture additional internal control signals within the core clock synchronizer controller for effectuating the functionality of the various constituent modules thereof. Accordingly, only certain salient features of the core clock synchronizer controller 124 will now be described.

The synchronizer ratio sampling block 300 generates an M-bit wide sync_ratio signal 318 by sampling M-bit wide sync_ratio_B signals 320 from the bus block domain. The sequence sampling block 302 samples the sequence B signal 322 on the rising edge of the core clock to produce a sequence_cr signal 324. Additionally, the sequence sampling block 302 samples the sequence_B signal 322 on the falling edge of the core clock to produce a sequence_cf signal 326. The precision sequence detector 304 generates a seq_state signal 328 and a sequence signal 330 in response to the sequence_cr signal 324 and sequence_cf signal 326. The core clock synchronizer controller 124 synchronizes a syncb0_B signal 332 using the syncbo sampling block 306 which produces a syncb0_cr signal 334 and a syncb0_cf signal 336 by employing a similar sampling technique. The synchronization pulse detector block 308 generates a sync_redge signal 338 in response to a sync signal 340, e.g., sync 118 provided by the SYNC sampling logic 116 (shown in FIG. 1).

As will be discussed in more detail hereinbelow, the core clock synchronizer controller 124 employs the precision sequence detector 304, the stable state detector 310, cycle and sequence generator 312, and skew state detector 314 to provide use of the entire skew range on modes where the skew tolerance is greater than one half core clock and the skew between the bus and core clocks cannot be counted on to be below one half core clock initially. The stable state detector block 310 receives the sync_ratio signal 318 provided by the synchronizer ratio sampling block 300, a sync_config signal 342 provided by the synchronizer configuration interface 126 of FIG. 1, a sync_locked signal 344 and a pd_z signal 346 provided by the skew state detector block 314, and a cycle signal 348 and a cycle_has_loaded signal 350 provided by the cycle and sequence generator 312. Based on the aforementioned input signals, the stable state detector block 310 generates a synchronizer_stable signal 352 which may be transmitted to the core clock domain logic circuitry 103A (shown in FIG. 1). A stable_state signal 354 is also generated which is used internally for generating other internal control signals of the core clock synchronizer controller circuitry.

The cycle and sequence generator block 312 receives the sync_ratio signal 318 from the synchronizer ratio sampling block 300, the sync_config signal 342 from the synchronizer configuration interface 126 of FIG. 1, the stable_state signal 354 from the stable state detector block 310, the sequence_cr and sequence_cf signals 324 and 326 from the sequence sampling block 302, the sync_redge signal 338 from the synchronizer pulse detector block 308, a skew_state signal 356 from the skew state detector block 314, the sequence signal 330 from the precision sequence detector block 304, the syncb0_cr and syncb0_cf signals 334 and 336 from the syncb0 sampling block 306, and pd_b_cr and pd_b_cf signals 358 and 360 from the phase detector block 130 of FIG. 1. In response to the input signals, the cycle and sequence generator 312 asserts the cycle_has_loaded signal 350, the cycle signal 348, and a sequence signal 362.

As illustrated, the skew state detector 314 receives the sync_ratio signal 318 from the synchronizer ratio sampling block 300, the sync_config signal 342 from the synchronizer configuration interface block 126 of FIG. 1, the stable_state signal 354 from the stable state detector 310, the cycle signal 348 from the cycle and sequence generator 312, the sync_redge signal 338 from the synchronizer pulse detector 308, the pd_b_cr and pd_b_cf signals 358 and 360 from the phase detector 130 of FIG. 1, and the seq_state signal 328 from the precision sequence detector 304. In response to the received signals, the skew state detector 314 asserts the sync_locked signal 344, the pd_z signal 346, and the skew_state signal 356.

The synchronizer control signal generator block 316 receives the sync_ratio signal 318 from the synchronizer ratio sampling block 300, the sync_config signal 342 from the synchronizer configuration interface 126, the cycle and sequence signals 348 and 362 from the cycle and sequence generator block 312, and the skew_state signal 356 from the skew state detector block 314. In response to the input signals, the synchronizer control signal generator block 312 asserts a c0_sel signal 362, a c1_sel signal 364, a core_sel signal 366, a b2c_valid signal 368, a c2b_valid signal 370, and a c2b_valid_m signal 372. Further details regarding signals 362-372 may be found in the aforementioned co-pending U.S. patent application entitled "Controller Arrangement for a Programmable Clock Synchronizer," filed Jul. 30, 2003; application Ser. No. 10/630,182, in the name(s) of: Richard W. Adkisson.

Figure 4:
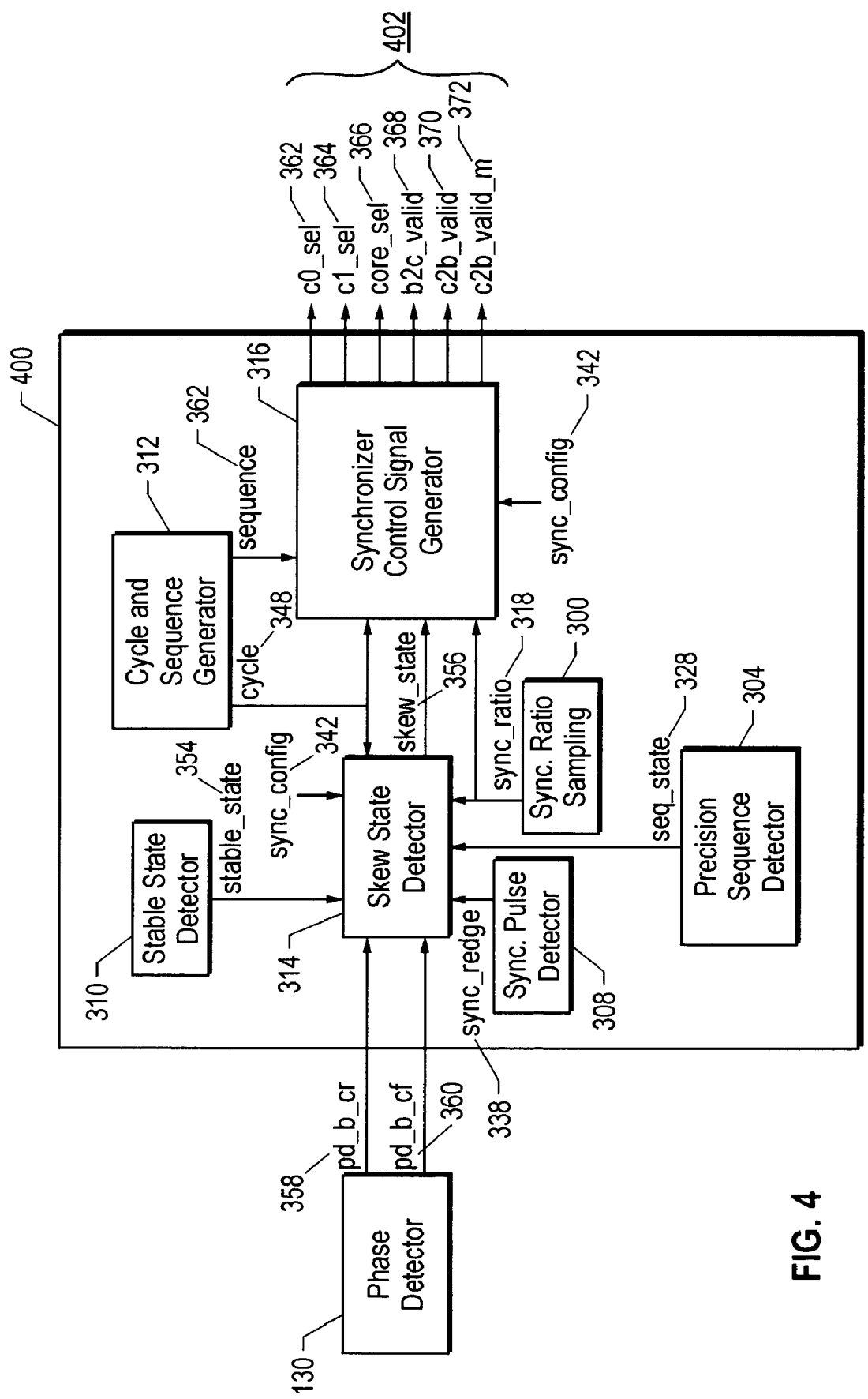
FIG. 4 depicts a block diagram of a portion of the core clock synchronizer controller of FIG. 3 that illustrates in further detail one embodiment of a system for compensating for skew between different clocks of the synchronizer circuitry.

FIG. 4 depicts a logic portion 400 of the core clock synchronizer controller 124 of FIG. 3 in order to highlight in further detail one embodiment of a system that provides skew compensation. The phase detector block 130 is operable to sample the second clock signal using the first clock signal and asserts the pd_b_cr signal 358 and the pd_b_cf signal 360. Further information about the phase detector may be found in the aforementioned co-pending U.S. Patent application entitled "Phase Detector for a Programmable Clock Synchronizer," filed Jul. 30, 2003; application Ser. No. 10/630,298, in the name(s) of: Richard W. Adkisson. The pd_b_cr signal 358 and the pd_b_cf signal 360 are received in the digital logic portion 400 of the core clock synchronizer controller 124 by the skew state detector block 314 which is positioned in communication with the phase detector block 130. The skew state detector block 314 determines a skew state signal, i.e., the skew_state signal 356 operable to track a phase relationship between the first and second clock signals, which is used by the synchronizer signal generator block 316 so as to generate a plurality of synchronizer control signals (e.g., control signals 402) at particular times that compensate for the skew difference between the clock signals. In particular, when the components of the core clock synchronizer controller block 124 are in an infinity mode, the system described herein may provide tolerance and compensation for even an entire core clock period or more of skew between the first clock signal and the second clock signal.

More specifically, with respect to the operation of the skew state detector block 314, the skew state detector block 314 employs a variety of signals in conjunction with the pd_b_cr signal 358 and the pd_b_cf signal 360 to generate the skew_state signal 356. In particular, the synchronization configuration interface block 126 of FIG. 1 provides the sync_config signal 342 to the skew state detector block 314 in order to set the different latencies, modes of operation and skew tolerances. For example, the sync_config signal 342 can be used to set the skew tolerance to 0.75 mode as described above in relation to FIG. 2. Additionally, the skew state detector block 314 receives the cycle signal 348 from the cycle and sequence generator block 312, the sync ratio signal 318 from the synchronizer ratio sampling block 300, the seq_state signal 328 from the precision sequence detector block 304, the sync_redge signal 338 from the synchronizer pulse detector block 308, and the stable state signal 354 from the stable state detector block 310. Using the aforementioned signals, the skew state detector block determines the skew state by determining the position of coincident edges of the bus clock and the core clock relative to the bus clock. The skew state is treated as "state Z" upon the detection of coincident bus and core clock rising edges at the zero point, i.e., cycle 0 of the bus clock timing window. If the rising edge of the core clock is detected lagging the rising edge of the bus clock, then the skew state is a positive skew state. For example, if the rising edge of the core clock lags the bus clock by one quarter cycle, then the state is P1, i.e., plus one. Similarly, if the rising edge of the core clock leads the bus clock by half a cycle, then the state is M2, i.e., minus two. Once the core clock signal leads or lags the bus clock by one full bus clock period, the skew state detector transitions the skew state back to its original state, Z. In this manner, an arbitrarily large and potentially infinite amount of skew may be tracked and compensated for.

In one embodiment, when first detecting the correct phase, the skew state detector block 314 cannot initially use the phase detector block 130 of FIG. 1 since aliasing may be present. For example, in the 5:4 frequency ratio, the core clock signal lagging the bus clock signal by one quarter core clock is identical to the core leading the bus by three quarters core clock. Thus initially, when the stable_state signal 354 is not fully asserted, the change (plus or minus) in state is only detected on a cycle when the synchronizer pulse detector block 308 detects the edge and the phase detector block 130 detects a change, or if the synchronizer pulse detector block 308 detects the edge has moved to another clock. After the signal is locked, the change, plus or minus, is detected on cycle 0 if the phase detector block 130 detects a change or if the synchronizer pulse detector block 308 detects a gross edge movement (for instance, two clocks). In one embodiment, to avoid stability issues due to lag time, the skew_state signal 356 only changes if it has been in the same state for at least two cycles. After two cycles of stability, for example, if a change in the skew state has been detected, then the change is stored but only implemented on the last sequence.

More specifically, with respect to the operation of the synchronizer control signal generator block 316, the synchronizer control signal generator block 316 employs a variety of signals to generate the control signals 402, which include the c0_sel signal 362, the c1_sel signal 364, the core_sel signal 366, the b2c_valid signal 368, the c2b_valid signal 370, and the c2b_valid_m signal 372, sent to the synchronizer circuitry including the core-to-bus synchronizer 105A and the bus-to-core synchronizer 105B. As alluded to before, further information about the control signals 402 may be found in the aforementioned co-pending U.S. patent application entitled "Programmable Clock Synchronizer," filed Jul. 30, 2003; application Ser. No. 10/630, 159, in the name(s) of: Richard W. Adkisson. However, it should be recognized by one skilled in the art that other types of synchronizer controllers generating different control signals may be used in practicing the invention set forth herein.

Continuing to refer to the synchronizer control signal generator block 316, in addition to the skew_state signal 356, the synchronizer control signal generator block 316 receives the sync_config signal 342 from the synchronizer configuration interface 126, the sync_ratio signal 318 from the synchronizer ratio sampling block 300, and the cycle signal 348 and sequence signal 362 from the cycle and sequence generator block 312. The synchronizer control signal generator block 316 decodes the sync ratio 318, the sync_config signal 342, the cycle signal 348, the sequence signal 362, and the skew_state signal 356 to initiate the control signals 402 at appropriate times.

For example, for a 5:4 frequency ratio, i.e., the sync_ratio signal 318=5:4, when the skew state equals Z, i.e., skew_state signal 356 equals Z, the synchronizer control signal generator block 316 asserts the "skew tol=0.75" pattern wherein the b2c_valid signal 368 is asserted low at cycle 3. When the skew_state signal 356=P1, however, the synchronizer control signal generator block 316 asserts the b2c_valid signal 318 low at cycle 4. When the skew_state signal 356=P2, the synchronizer control signal generator block 316 asserts the b2c_valid signal 318 low at cycle 0.

When the skew_state signal 356=M1, the synchronizer control signal generator block 316 asserts the b2c_valid signal 318 low at cycle 2. The c2b_valid signal 370 makes a similar progression from cycle 1 to cycle 2 and eventually back to cycle 1. Moreover, the c0_sel signal 362, the c1_sel signal 364, and the core_sel signal 366 are similarly compensated to allow a skew tolerance of 0.75 core clocks in the new skew states. In one embodiment, the alternating states represented by the c0_sel signal 362 and the c1_sel signal 364 change relative to the c2b_valid signal 370 and the value of the core_sel signal 366 changes relative to the value of the b2c_valid signal 370. Moreover, the value of the c2b_valid_m signal 372 may be viewed as an early indication of the value of the c2b_valid signal 370 and the various transition states, for example Z_P1.

Figure 5:
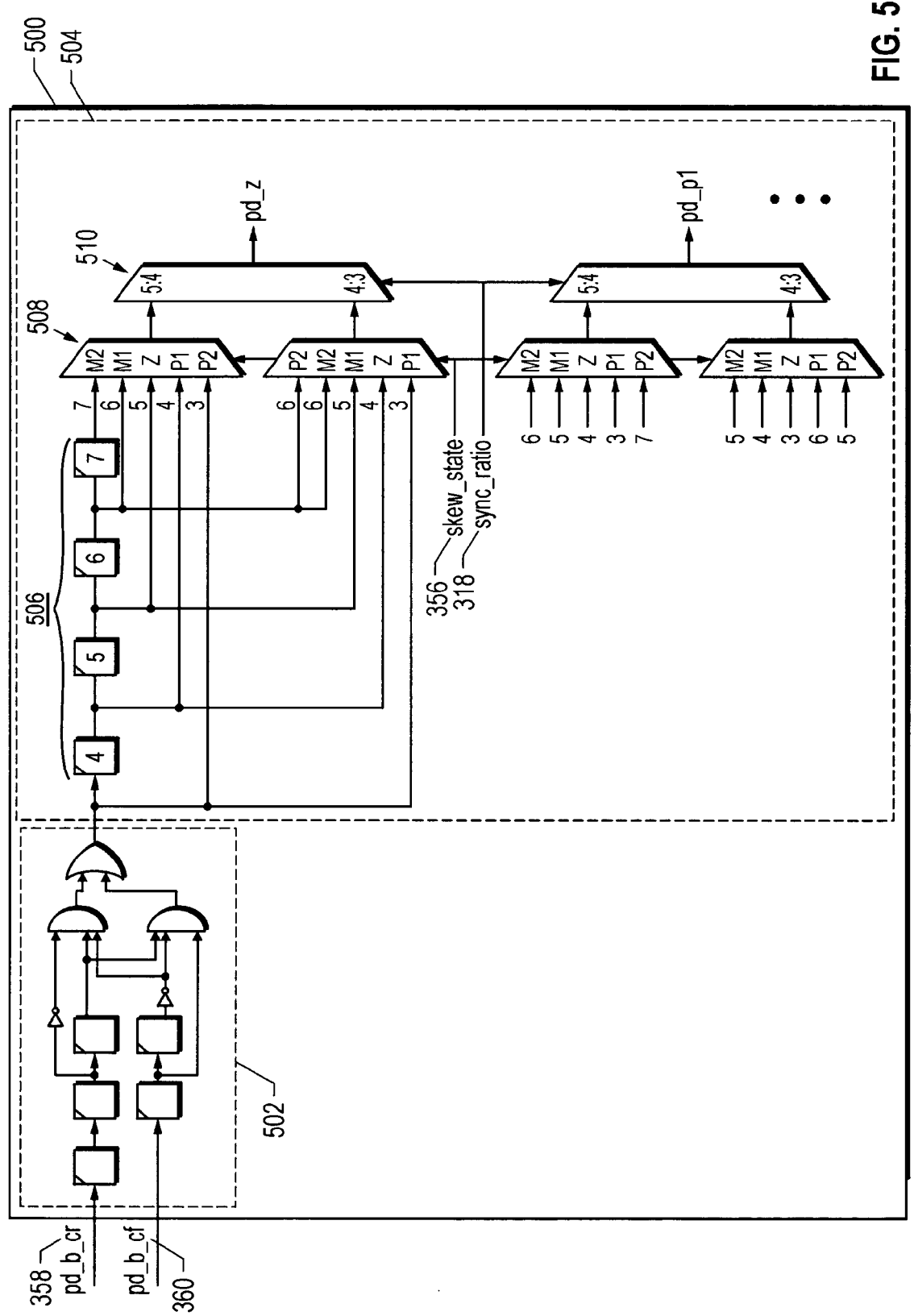
FIG. 5 depicts a schematic diagram of one embodiment of a portion of a skew state detector employed in conjunction with the teachings described herein.

FIG. 5 depicts one embodiment of a portion of a skew state detector 500 employed in conjunction with the teachings described herein. The phase detector 130 asserts the pd_b_cr signal 358 and the pd_b_cf signal 360 which are received by a first circuit portion 502 which determines the coincident edges. The first circuit portion 502 includes a series of three registers which sample the pd_b_cr signal 358 and a series of two registers which sample the pd_b_cf signal 360. The two sampled signals are cross-supplied to a pair of AND gates whose outputs are provided to an OR gate. The first circuit portion 502 is operable to detect the first edge, which is a 1-to-0 transition on the rising signal, i.e., the pd_b_cr signal 358, and a 0-to-1 transition on the falling signal, i.e., the pd_b_cf signal 360. Upon detecting one current condition (either a 0 on the rise or a 1 on the fall) and both of the previous conditions (1 on the rise and 0 on the fall), the first circuit portion asserts a signal indicative of detected coincident edge to a second circuit portion 504 which determines the skew state and associated signaling.

More particularly, within the second circuit portion 504, a series of registers 506 operate to provide a plurality of taps to a first set of MUX blocks 508. The skew_state signal 356 provides control to the MUX blocks 508 which determine the skew state transition for each ratio. Once the skew state transition is determined, a second set of MUX blocks 510 controlled by the sync_ratio signal 318 determines the appropriate skew transition that corresponds to the synchronization ratio of the clock signals used. It should be appreciated that only a portion of the second circuit portion 504 is depicted. In particular, an embodiment of the entire second circuit portion 504 would include a MUX block 510 for each skew transition (i.e., plus, minus, or none) and a MUX block 508 for each frequency ratio. As exemplified, MUX blocks 510 are shown for each of the illustrated skew transitions pd_z (none) and pd_p1 (plus 1), and MUX blocks 508 are shown for each frequency ratio, 5:4 and 4:3. Likewise, MUX blocks 510 and 508 are also provided with respect to other transitions, e.g., pd_p2 (plus 2), pd_m1 (minus 1) and pd_m2 (minus 2).

In operation, the second circuit portion 504 of the skew state detector block 314 asserts the pd_z signal 346 active when the phase detector block 130 detects coincident bus and core clock rising edges at the zero point, i.e., the location where the synchronizer pulse detector block 308 states that the coincident edge is positioned. With the sync_config signal 342 set to infinity mode, the pd_z signal is active when the skew is compensated by the skew_state signal 356.

Figure 6:
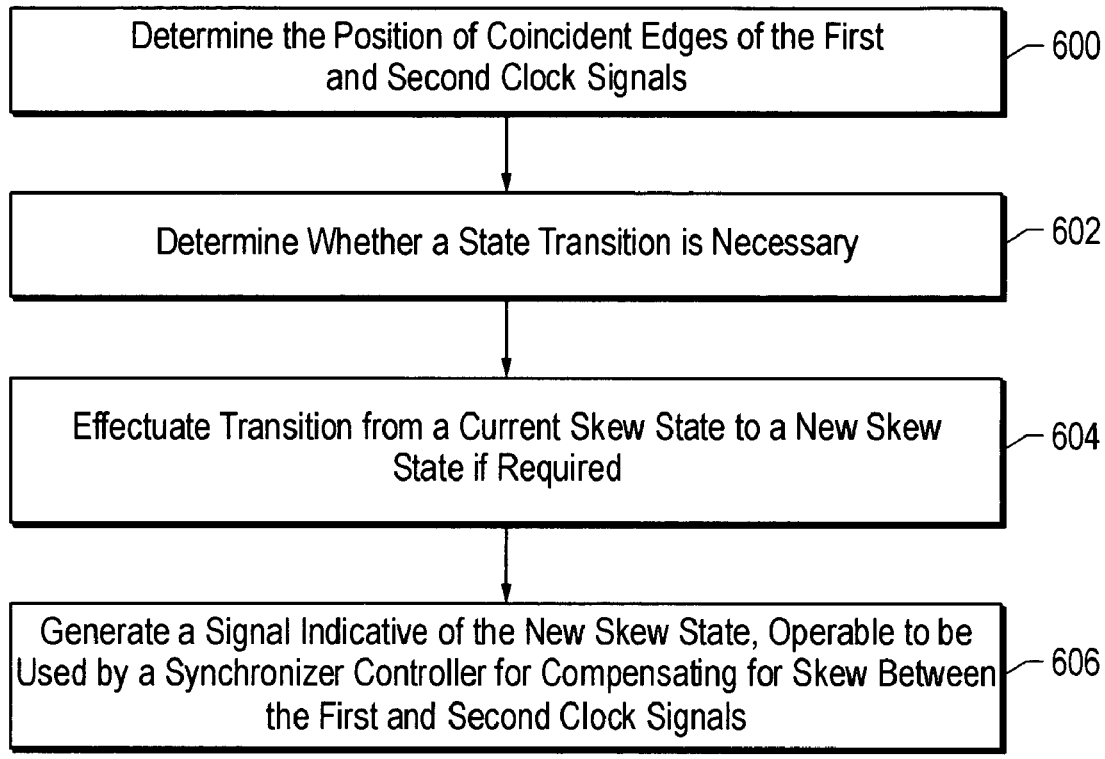
FIG. 6 depicts a flow chart of one embodiment of a method for compensating for skew between a first clock signal and a second clock signal.

FIG. 6 depicts a method for compensating for skew between a first clock signal and a second clock signal. In one embodiment, this method may be practiced in conjunction with a phase detector that is operable to sample one clock (e.g., a second clock signal) using another clock (e.g., a first clock signal) for determining a phase difference therebetween. The method commences at block 600 where the position of the coincident edges is determined relative to the first clock signal and the second clock signal. The coincident edges may be either coincident rising edges or coincident falling edges. At block 602, a determination is made as to whether a skew transition is necessary, and if so, by how much, which is based on tracking the phase relationship between the clock signals. Responsive to the determination at block 602, transition from the current skew state to a new skew state is effectuated, e.g., in a state machine (block 604). Thereafter, at block 606, a signal indicative of the new skew state is generated, which is used by the controller circuitry to appropriately adjust the production of its synchronizer control signals, thereby compensating for the skew between the first clock signal and the second clock signal. It should be appreciated by one of ordinary skill in the art that the present method can provide compensation for a skew ranging from ⅛th of a cycle to an entire clock period or more.

Figure 7:
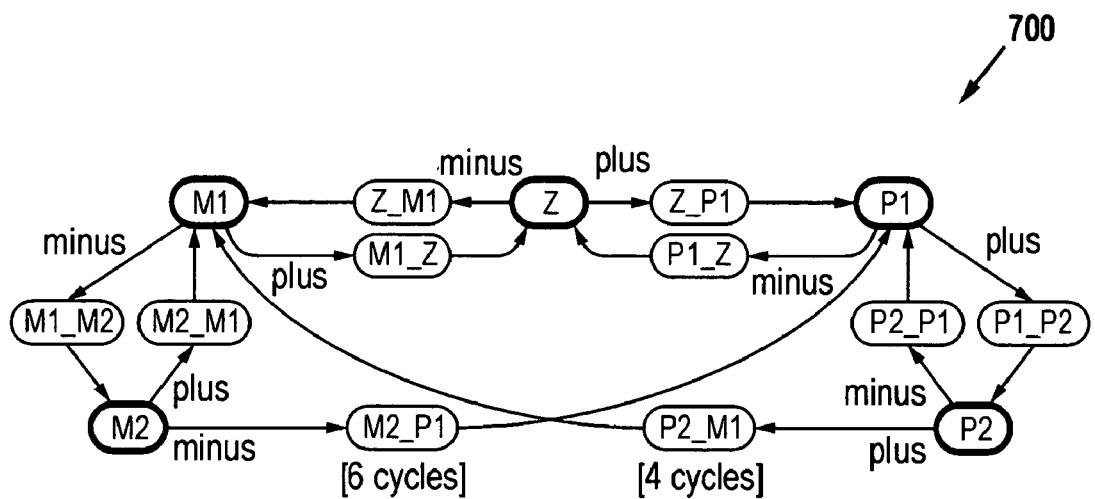
FIG. 7 depicts one embodiment of a state machine effectuated by a skew state detector associated with the system for compensating for skew between a first clock signal and a second clock signal having a 5:4 frequency ratio.

FIG. 7 depicts one embodiment of a state machine 700 effectuated by the skew state detector associated with the system for compensating for skew between a first clock signal and a second clock signal for a 5:4 frequency ratio. With reference to the transition state diagram of the state machine 700, bold ovals illustrate the states, P1, P2, M1, M2, and Z, which in turn, represent multiples of a quarter core clock skew. In particular, the P1 (plus 1) state represents +¼ clock skew, the P2 (plus 2) state represents +½ clock skew, the M1 (minus 1) state represents −¼ clock skew, the M2 (minus 2) state represents −½ clock skew, and the Z (zero) state represents 0 clock skew. As previously discussed, the skew state is Z upon the detection of coincident bus and core clock rising edges at the zero point, i.e., cycle 0 of the bus clock timing window. If the rising edge of the core clock is detected lagging the rising edge of the bus clock, then the skew state is a plus skew state such as P1 or P2. On the other hand, if the rising edge of the core clock is detected leading the rising edge of the bus clock, then the skew state is a minus skew state such as M1 or M2, depending on the amount by which the rising edge of the core clock leads the rising edge of the bus clock. The ovals, such as Z_P1 and M2_M1, illustrate intermediary transition states. For example, the Z_P1 transition indicates a plus transition from the Z state to the P1 state and the M1_M2 transition indicates a minus transition from the M1 state to the M2 state. The skew state detector 314 dynamically detects, determines and tracks the skew state in order to compensate for the phase difference between the bus clock and core clock signals. Moreover, in order to provide an infinite amount of skew tolerance, the skew state detector provides for transitioning the skew state back to Z when one full clock period of skew is detected.

Figure 8:
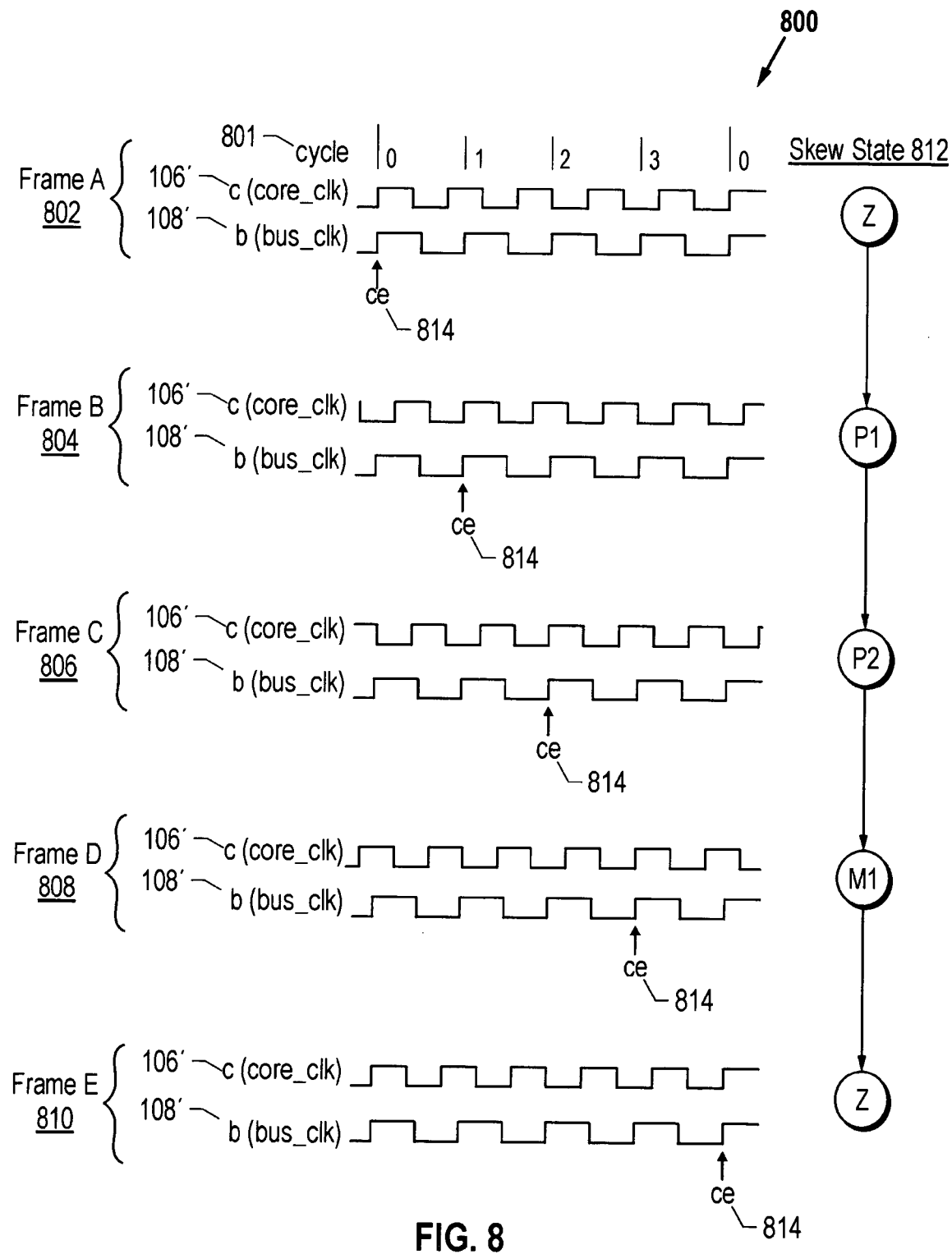
FIG. 8 depicts a timing diagram of two clock domains having a 5:4 frequency ratio wherein the clock signals associated with the skew state transitions of FIG. 7 are illustrated in further detail.

FIG. 8 depicts a timing diagram of two clock domains having a 5:4 frequency ratio wherein one embodiment of the skew state transitions of FIG. 7 is illustrated in further detail. The cycle count 801 refers to the numbering of bus_clock cycles in a particular timing sequence. The core clock signal 106' and the bus clock signal 108' are illustrated over a period of time represented by a series of panels, i.e., Frame A 802, Frame B 804, Frame C 806, Frame D 808, and Frame E 810. The skew state 812 of the system at each panel 802-810 is indicated to right of the panel. For example, in Frame A 802 the skew state 812 is Z and in Frame D 808 the skew state is M1. Coincident edges (ce) 814 indicate the coincident rising edges of the core clock signal 106' and the bus clock signal 108'. As illustrated, in Frame A 802, the skew state 812 equals Z as the coincident edges 814 are at cycle 0. In Frame B 804, as the core clock lags the bus clock by ¼ core clock, the skew state transitions from Z to P1 via transition Z_P1. In this panel, the coincident edges 814 are positioned at the rising edge of the second cycle, i.e., cycle 1. As illustrated in Frame C 806, as the core clock lags even more (i.e., ½ of the core clock skew), the coincident edges 814 are positioned at the rising edge of the third cycle, i.e., cycle 2. At this time, the skew state 812 is P2 or plus two. During Frame D 808, the core clock lags the bus clock by another quarter cycle, so the skew state 812 transitions to M1, which is equivalent to P3 in a 5:4 frequency ratio synchronization scheme, via a P2_M1 transition. In Frame E 810, further skew difference (i.e., an additional ¼ cycle) transitions the skew state from M1 to Z via transition M1_Z. At this time, an entire core clock period of skew is present and the skew state has transitioned back to skew state Z. As will be appreciated, this could happen an arbitrarily large number of times. Accordingly, although the amount of skew may be arbitrarily large or infinite, the skew may be tracked and compensated for.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for compensating for skew in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/M≧1, the system comprising:
   a phase detector operable to detect a phase difference between said first clock signal and said second clock signal;
   a skew state detector disposed in communication with said phase detector for generating a skew state signal which tracks a phase relationship between said first clock signal and said second clock signal relative to a zero point of a timing window corresponding to said second clock signal; and
   a synchronizer control signal generator, responsive to said skew state signal, for generating at least one control signal according to a value of said skew state signal.

2. The system as recited in claim 1, wherein said skew state signal is operable to compensate for greater than one clock period difference between said first clock signal and said second clock signal.

3. The system as recited in claim 1, wherein said at least one control signal is used to facilitate data transfer between said first clock domain and said second clock domain.

4. The system as recited in claim 1, wherein said zero point comprises an instance of coincident rising edges.

5. The system as recited in claim 1, wherein zero point comprises an instance of coincident falling edges.

6. The system as recited in claim 1, wherein said skew state detector generates said skew state signal (skew_state) in response to sampled clock signals (pd_b_cr and pd_b_cf) provided by said phase detector.

7. The system as recited in claim 1, wherein said at least one control signal comprises an indication whether a current data transfer contains valid data.

8. The system as recited in claim 1, wherein said at least one control signal is selected from the signal group comprising c0_sel, cl_sel, core_sel, b2c_valid, c2b_valid, and c2b_valid_m.

9. A method for compensating for skew in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/M≧1, the method comprising:
   determining a phase difference between said first clock signal and said second clock signal relative to a zero point of a timing window corresponding to said second clock signal;
   deciding if a state transition is necessary based on a result of said determining step; and
   generating a control signal indicative of said state transition, thereby compensating for said skew between said first clock signal and said second clock signal.

10. The method as recited in claim 9, wherein the operation of determining a phase difference between said first clock signal and said second clock signal determines the phase difference to be at least one quarter cycle apart.

11. The method as recited in claim 9, wherein said state transition comprises a transition that tracks a negative skew difference between said first and second clock signals.

12. The method as recited in claim 9, wherein said state transition comprises a transition that tracks a positive skew difference between said first and second clock signals.

13. The method as recited in claim 9, wherein said control signal is operable to indicate that no skew state transition is necessary.

14. The method as recited in claim 9, wherein said control signal is indicative of a temporal relationship between said coincident edges and said second clock signal.

15. A computer system having an apparatus for compensating for skew in a programmable clock synchronizer for effectuating data transfer between first circuitry disposed in a first clock domain and second circuitry disposed in a second clock domain, wherein said first clock domain is operable with a first clock signal and said second clock domain is operable with a second clock signal, said first and second clock signals having a ratio of N first clock cycles to M second clock cycles, where N/N≧1, the computer system comprising:
   means for determining a phase difference between said first clock signal and said second clock signal relative to a zero point of a timing window corresponding to said second clock signal;
   means for deciding if a state transition is necessary based on a result of said determining; and means for generating a control signal indicative of said state transition, thereby compensating for said skew between said first clock signal and said second clock signal.

16. The computer system as recited in claim 15, wherein said means for determining a phase difference between said first clock signal and said second clock signal comprises means for determining said first clock signal and said second clock signal to be at least one quarter cycle apart.

17. The computer system as recited in claim 15, wherein said state transition comprises a transition that tracks a negative skew difference between said first and second clock signals.

18. The computer system as recited in claim 15, wherein said state transition comprises a transition that tracks a positive skew difference between said first and second clock signals.

19. The computer system as recited in claim 15, wherein said control signal is operable to indicate that no skew state transition is necessary.

20. The computer system as recited in claim 15, wherein said control signal is indicative of a temporal relationship between said coincident edges and said second clock signal.

* * * * *

UNITED STATES PATENT AND TRADEMARK OFFICE
CERTIFICATE OF CORRECTION

PATENT NO. : 7,245,684 B2
APPLICATION NO. : 10/630317
DATED : July 17, 2007
INVENTOR(S) : Richard W. Adkisson It is certified that error appears in the above-identified patent and that said Letters Patent is hereby corrected as shown below:

In column 8, line 3, delete "syncbo" and insert -- syncb0 --, therefor.

In column 14, line 3, in Claim 5, after "wherein" insert -- said --.

In column 14, line 60, in Claim 15, delete "N/N$\geq$1" and insert -- N/M$\geq$1 --, therefor.

Signed and Sealed this

Fifth Day of August, 2008

JON W. DUDAS
*Director of the United States Patent and Trademark Office*